June 27, 1933.  W. MÖBIUS  1,915,375
MACHINE TOOL WITH RECIPROCATING CARRIAGE (TURRET LATHE OR THE LIKE)
Filed May 20, 1930    4 Sheets-Sheet 1

June 27, 1933. W. MÖBIUS 1,915,375
MACHINE TOOL WITH RECIPROCATING CARRIAGE (TURRET LATHE OR THE LIKE)
Filed May 20, 1930 4 Sheets-Sheet 4

Patented June 27, 1933

1,915,375

UNITED STATES PATENT OFFICE

WALTER MÖBIUS, OF MAGDEBURG, GERMANY, ASSIGNOR TO MAGDEBURGER WERK-ZEUGMASCHINENFABRIK AKTIENGESELLSCHAFT, OF MAGDEBURG, GERMANY

MACHINE TOOL WITH RECIPROCATING CARRIAGE (TURRET LATHE OR THE LIKE)

Application filed May 20, 1930, Serial No. 454,157, and in Germany April 24, 1930.

In machine tools with reciprocating carriage, which carries the tools (rest) for working the blanks, the arrangements for actuating the tool carriage by hand or mechanical means were hitherto mounted on the slide of the carriage or turret head. Consequently they moved always with the carriage. This however leads to inconveniences, when the machine tool is working.

Consequently the invention sets out, to fix on the bed of the machine tool that part of the machine tool, on which the handles, hand wheels and other operating parts of the shiftable carriages or slides are fastened and also to mount the transmission elements, shafts, gear wheels and the like, in the bed of the machine tool and to connect same with the movable part of the carriage by suitable intermediate means.

An embodiment of the invention is illustrated by way of example in the accompanying drawings in which.

Figure 1:
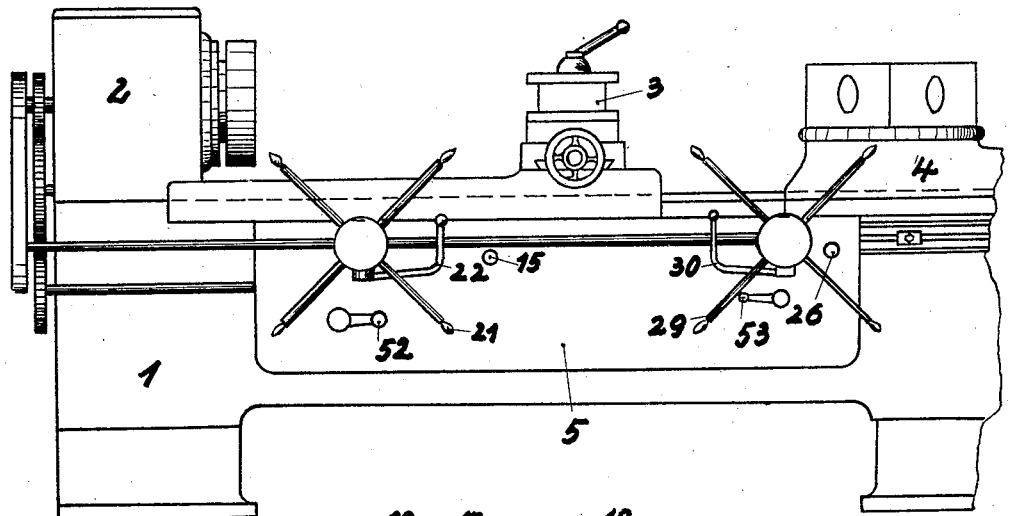
Fig. 1 shows in side elevation a part of a turret lathe.
Figure 2:
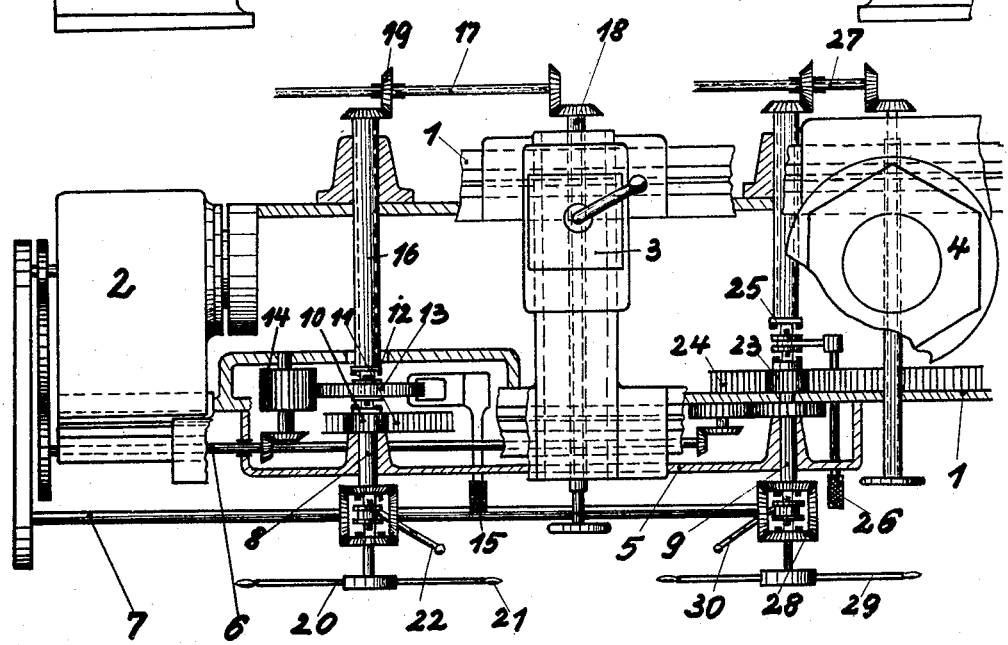
Fig. 2 is a top plan view of Fig. 1.

The turret lathe consists in known manner of a bed 1, a head stock 2, a turning turret head 3 and a drilling turret head 4. This latter is for example vertically arranged. A common apron 5 is provided for the driving elements of the two turret heads, which apron is fitted on the bed of the machine tool. The turret lathe is for example provided with two different speeds in the drive for the movement of the carriage. The drive for the turning and drilling-turret heads is effected from the shaft 6, the shaft 7 serving for the accelerated speed. The two transverse shafts 8 and 9, from which the turning and drilling turrets are driven, are mounted in the bed.

The driving elements for the turning turret head will first be hereinafter described and then those for the drilling turret head.

Figure 3:
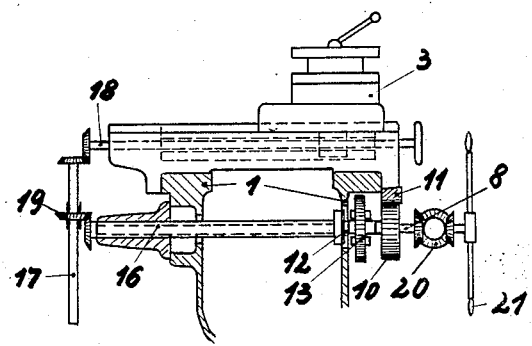
Fig. 3 shows in side elevation the drive of the surfacing mechanism.
Figure 4:
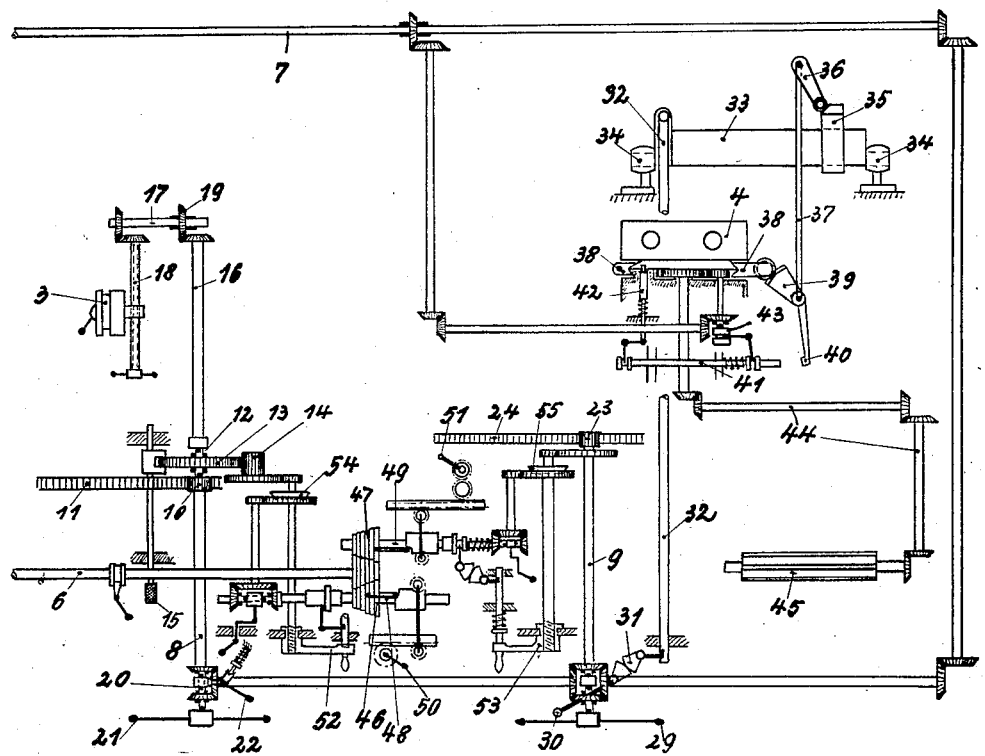
Fig. 4 is a gearing diagram for those parts of the machine tool, which come into question for the invention.

A pinion 10 engaging in a rack 11 on the turning turret head is keyed on the shaft 8. This effects the feed of the turning turret head. A gear wheel 13, which engages with a pinion 14 is connected with a clutch 12. The shifting of the gear wheel 13 is effected by a handle 15. If this handle is pulled forward, the turret head is longitudinally shifted through the pinion 10. If the handle is moved towards the other side, a hollow shaft 16 is engaged, and thereby rotated so that a spindle 18 is driven through the oscillatable shaft 17, said spindle shifting the turning turret head transversely to the machine tool. As the shaft 8 or 16 is rigidly mounted in the bed, whereas the spindle 18 travels with the turret head, the shaft 17 is made oscillatable and slides through the boss of the bevel wheel 19 (see also Fig. 3). For engaging the rapid traverse from the shaft 7 a reversing gear 20 is provided, with which a hand star 21 is also connected. A lever 22 serves for engaging the clutch of the reversing gear.

The drive for the drilling turret head is effected in a similar manner from the shaft 6. A pinion 23, which shifts a rack 24 connected with the turret head is rotated from the shaft 9. A clutch 25 for changing from longitudinal shifting to the surfacing shifting is activated by a lever 26; and an oscillating shaft is also provided. Reversing gear 28, hand star 29 and control lever 30 are arranged in a similar manner to the arrangement for the turning turret head.

The diagram of the gearing shows the arrangements of the several gear elements still more clearly and above all the device for controlling the drilling turret head 4. By actuating the hand lever 30 for engaging the accelerated speed a rod 32 is shifted through a segment 31. This rod turns a guide bar 33 which is rotatably mounted on brackets 34. A cam block 35 is shiftable on this guide bar 33 and brought to the positions in which the drilling turret head 4 is in its extreme position, in which the control and subsequently the forward travel begin. This control is initiated by a lever 36, which on encountering the cam block revolves a link 37 and thereby first lifts a divided friction clamp 38 through the intermediary of a lever 39. An arm 40 of the lever then strikes further against a rod 41, shifts the same, thereby disengaging an index pin 42, and engages the clutch 43. Thus the drive for the turret head 4 is engaged and this turret head rotated until the desired position is reached.

A control cylinder 45 is connected with the turret head 4 through transmission elements 44.

The diagram of the gearing shows the drive of the slides from the shaft 6 through the intermediary of a set of gears 46, 47 in which, for example by shifting of draw keys 48, 49 by means of levers 50, 51, any desired transmission is engaged. Levers 52 and 53, which are provided with steep pitched screw thread, actuate clutches 54 and 55.

The arrangement for automatically controlling the turret head is more clearly illustrated in Figs. 5 to 12. The cam block 35 has two cams 56 and 57, which are separated the one from the other by a gap. It is connected with a rapid traverse clutch 59 by means of the rod 32. It carries further on its upper side a roller 60, which bears against the nose 61 on the turret head. The lever 39 carries two rollers 62 and 63, between which a tongue 64 is arranged.

Figures 5, 6:
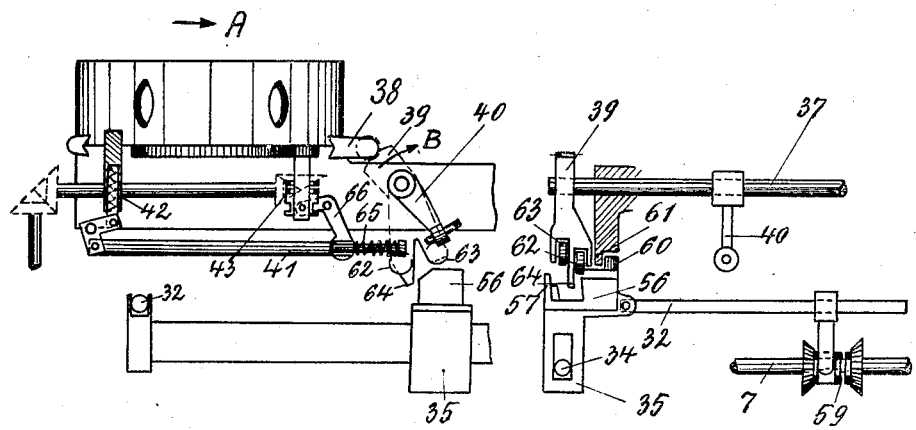
Figs. 5 to 12 show the automatic controlling device for the turret head in different positions.
Figures 7, 8:
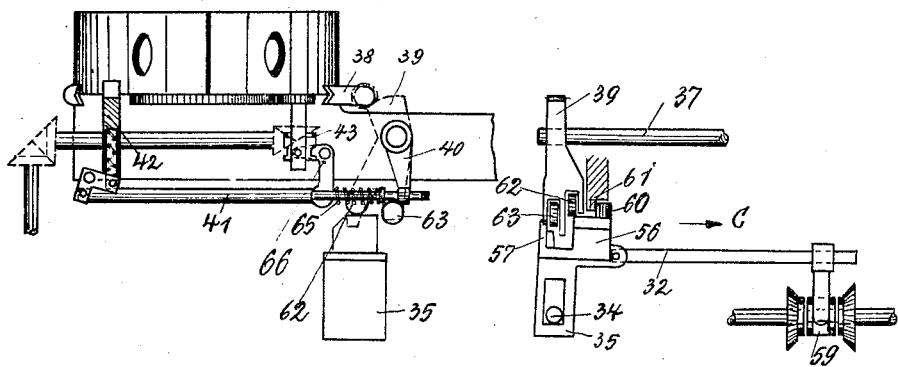
Figures 9, 10:
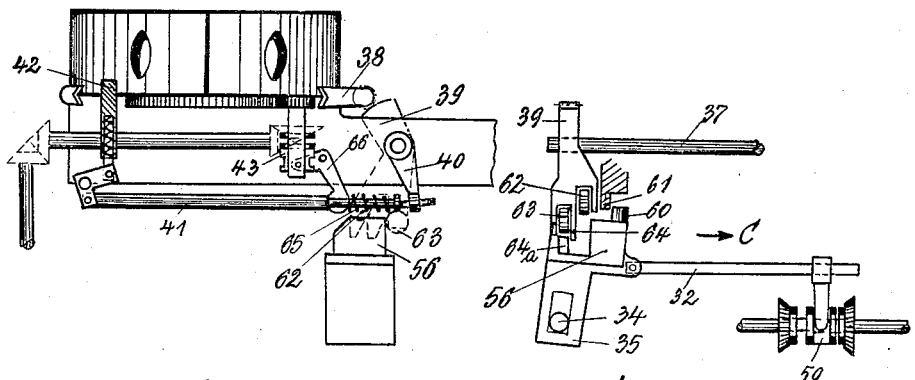

The controlling device for the turret head operates in the following manner. Fig. 5 shows the turret head during the reverse movement, arrow A. The rapid traverse 7, Fig. 6 is engaged. The cam 56 of the cam block is so set by the connecting rod 32, that the roller 62 can run onto the cam. On the roller running onto the cam the lever 39 is turned in the direction of the arrow B, the brake shaft being consequently turned and the brake lifted. The reverse travel is ended, in that the roller 60 runs against the nose 61. The block 35 is thereby turned around the bearing points 34 (Fig. 8), the rod 33 moved in the direction of the arrow C, and the accelerated speed clutch 59 disengaged. The turret head then comes to a standstill.

During the turning of the lever 39 the arm 40 strikes with its adjustable end against the rod 41 (Fig. 7), thereby disengaging the index pin 42, and shortly after a lever 66 is oscillated by a spring 65 and the clutch 43 engaged. Thus the turret head is not only turned ⅙ of a revolution after which the index pin again engages, but the turret head continues to rotate until the clutch is again disengaged by hand.

Figures 11, 12:
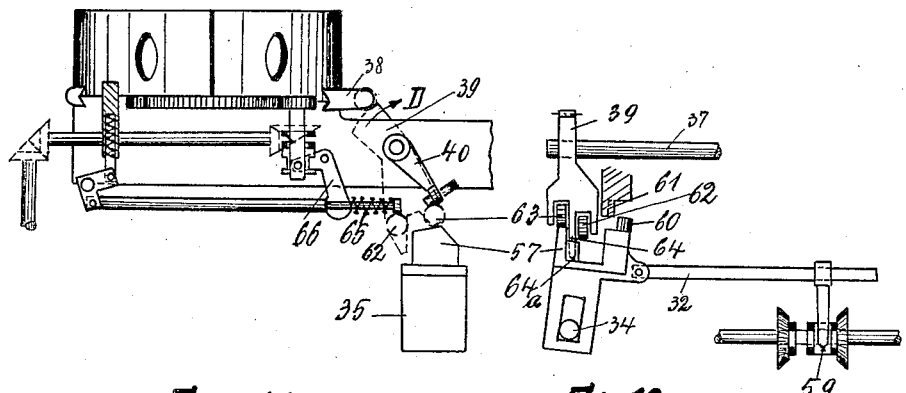

If it is desired to throw out the control, the rod 32 is shifted further in the direction of the arrow C (Fig. 10) by means of the hand lever 30, the cam block being thereby further turned. This movement is limited in that a stop 64a on the cam block comes into contact with the tongue 64 (Fig. 10) so that the rapid traverse is not yet engaged, as is shown by the position of the rapid traverse clutch 59 in Fig. 10. This prevents the rapid traverse being engaged for the forward movement before the turret head has assumed the desired position by engaging of the index pin 42. When the shifting has gone so far that the index pin can engage, the spring of the index pin pushes back the connecting rod 41 and releases the clutch 43. Thus the control of the turret head is ended. Moreover the lever 40 is thereby thrown back and the tongue 64 then releases the abutment 64a. The clutch 59 can then be engaged for the rapid traverse and the clutch and the cam block arrive in their extreme position (Fig. 12). The nose 57 comes then under the roller 63. If the carriage moves forward, the brake lever 39 is oscillated in the direction of the arrow D, and the brake of the turret head applied. The turret head is now once more in operative position.

The different movements and lockings of the lever 30 are naturally effected in very quick succession and are carried out by the operator as one operation. At the same time however the brake of the turret head is also applied.

I claim:—

1. A turret lathe, comprising in combination with the lathe bed having guides, two carriages shiftably mounted on said guides, a turning turret head on one of said carriages, a drilling turret head on the other of said carriages, a driving shaft in said bed, transmission gearings for effecting the transverse and traverse movements of said carriages, an apron on the front of said bed, elements on said apron for operating said gearings by hand to effect the hand transverse and traverse feed of said carriages, means for connecting said gearings with said driving shaft, and further elements also arranged on said apron adapted to control said means to connect said gearings with said driving shaft to mechanically effect the rapid traverse, slow traverse and transverse feeds of said carriages.

2. A machine tool as specified in claim 1, comprising in combination with the machine bed the carriages and the movable slides, shafts mounted transversely in said bed, spindles of said slides, oscillatably mounted shafts connecting said transverse shafts with said spindles, racks connected with said carriages, clutches on said transverse shafts adapted to engage the longitudinal feed through said racks, and the transverse shifting of said slides, and hand wheels arranged on said machine bed at the operating place adapted to effect the adjustment of said slides.

3. A machine tool as specified in claim 1, comprising in combination with the slides and the machine bed, means for operating said slides, clutches in said operating means, and hand levers arranged on said machine bed at the operating point adapted to actuate said clutches.

4. A machine tool as specified in claim 1, comprising in combination with the drilling turret head, a lever, a rod, transmission elements connecting said lever to said rod, an oscillatably mounted guide bar adapted to engage with said rod, a cam block shiftable on said bar, a brake and a control mechanism, said cam block adapted at the end of the reverse movement of the drilling head to lift said brake engage said control mechanism and after the termination of the control movement to again apply said brake.

5. A machine tool as specified in claim 1, comprising in combination, a cam block, two cams separately mounted with a gap between them on said block, rollers running on said cams, a lever carrying said rollers, a segment adapted to be operated by said lever, a brake adapted to be actuated by said segment, a stationary abutment, and a roller connected with said cam block adapted to contact with said abutment and to engage the oscillating movement of said cam block.

6. A machine tool as specified in claim 1, comprising in combination, a clutch, a cam block, two cams mounted separately on said block with a gap between them, a lever, a tongue on said lever extending into said gap and an abutment on said block bearing against said tongue, adapted to limit the movement of said clutch.

7. A machine tool as specified in claim 1, comprising in combination a rod, an oscillatable arm, a stop on said arm adapted to shift said rod on the oscillation of said arm, an index pin, and a clutch adapted to be engaged and disengaged by said rod.

In testimony whereof I affix my signature.

WALTER MÖBIUS.